(12) United States Patent
Dome et al.

(10) Patent No.: US 10,805,172 B2
(45) Date of Patent: Oct. 13, 2020

(54) CLOSED-LOOP DEPLOYMENT OF VIRTUAL FUNCTIONS AND CLOUD INFRASTRUCTURE

(71) Applicant: AT&T Intellectual Property I, L.P., Atlanta, GA (US)

(72) Inventors: George Dome, Tinton Falls, NJ (US); Dean Bragg, Toms River, NJ (US); Chuxin Chen, San Francisco, CA (US); John Ng, Morganville, NJ (US); John Oetting, Zionsville, PA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 169 days.

(21) Appl. No.: 15/488,147

(22) Filed: Apr. 14, 2017

(65) Prior Publication Data
US 2018/0302273 A1 Oct. 18, 2018

(51) Int. Cl.
*H04L 15/00* (2006.01)
*H04L 12/24* (2006.01)
*H04L 29/08* (2006.01)

(52) U.S. Cl.
CPC ........ *H04L 41/147* (2013.01); *H04L 41/0816* (2013.01); *H04L 41/0893* (2013.01); *H04L 41/0896* (2013.01); *H04L 41/5025* (2013.01); *H04L 67/34* (2013.01); *H04L 41/5096* (2013.01)

(58) Field of Classification Search
CPC .......................... H04L 41/082; H04L 41/0823
See application file for complete search history.

(56) References Cited

U.S. PATENT DOCUMENTS

| 5,812,937 | A  | * | 9/1998 | Takahisa | H04H 20/28 455/45 |
| 9,038,065 | B2 | * | 5/2015 | Arroyo | H04L 41/0806 718/1 |
| 9,167,050 | B2 |   | 10/2015 | Durazzo et al. | |
| 9,454,294 | B2 |   | 9/2016 | Sapuram et al. | |
| 2005/0027870 | A1 | * | 2/2005 | Trebes, Jr. | H04B 1/715 709/227 |
| 2012/0060165 | A1 | * | 3/2012 | Clarke | G06F 9/5038 718/104 |
| 2012/0271935 | A1 | * | 10/2012 | Moon | G06F 9/5094 709/224 |
| 2014/0365662 | A1 | * | 12/2014 | Dave | G06F 9/45533 709/226 |

(Continued)

OTHER PUBLICATIONS

"The Need for Service Catalog Design in Cloud Services Development"; Service Catalog Design; White Paper; Cisco; © 2011; 12 pages.

*Primary Examiner* — Yves Dalencourt
(74) *Attorney, Agent, or Firm* — BakerHostetler

(57) ABSTRACT

A method includes receiving metadata for deploying a virtual function on a cloud network. The metadata includes a recipe, policy, and template. The method includes, based on the metadata, designing a cloud plan and a transport plan for deploying the virtual function on the cloud network to meet a forecasted demand. The method includes determining a network configuration to implement the cloud plan and the network plan based on the metadata and causing the cloud network to be configured using the network configuration. The method includes instantiating the virtual function on the configured cloud network.

19 Claims, 13 Drawing Sheets

(56) References Cited

U.S. PATENT DOCUMENTS

| | | |
|---|---|---|
| 2015/0234725 A1 | 8/2015 | Cillis et al. |
| 2016/0212020 A1 | 7/2016 | Gupte et al. |
| 2016/0226663 A1 | 8/2016 | Jones et al. |
| 2016/0241446 A1 | 8/2016 | Gupte et al. |
| 2016/0285694 A1 | 9/2016 | Maes |
| 2016/0337356 A1 | 11/2016 | Simon et al. |
| 2017/0006083 A1 | 1/2017 | McDonnell |
| 2017/0041206 A1 | 2/2017 | Maes et al. |
| 2017/0063598 A1 | 3/2017 | Zhu et al. |

\* cited by examiner

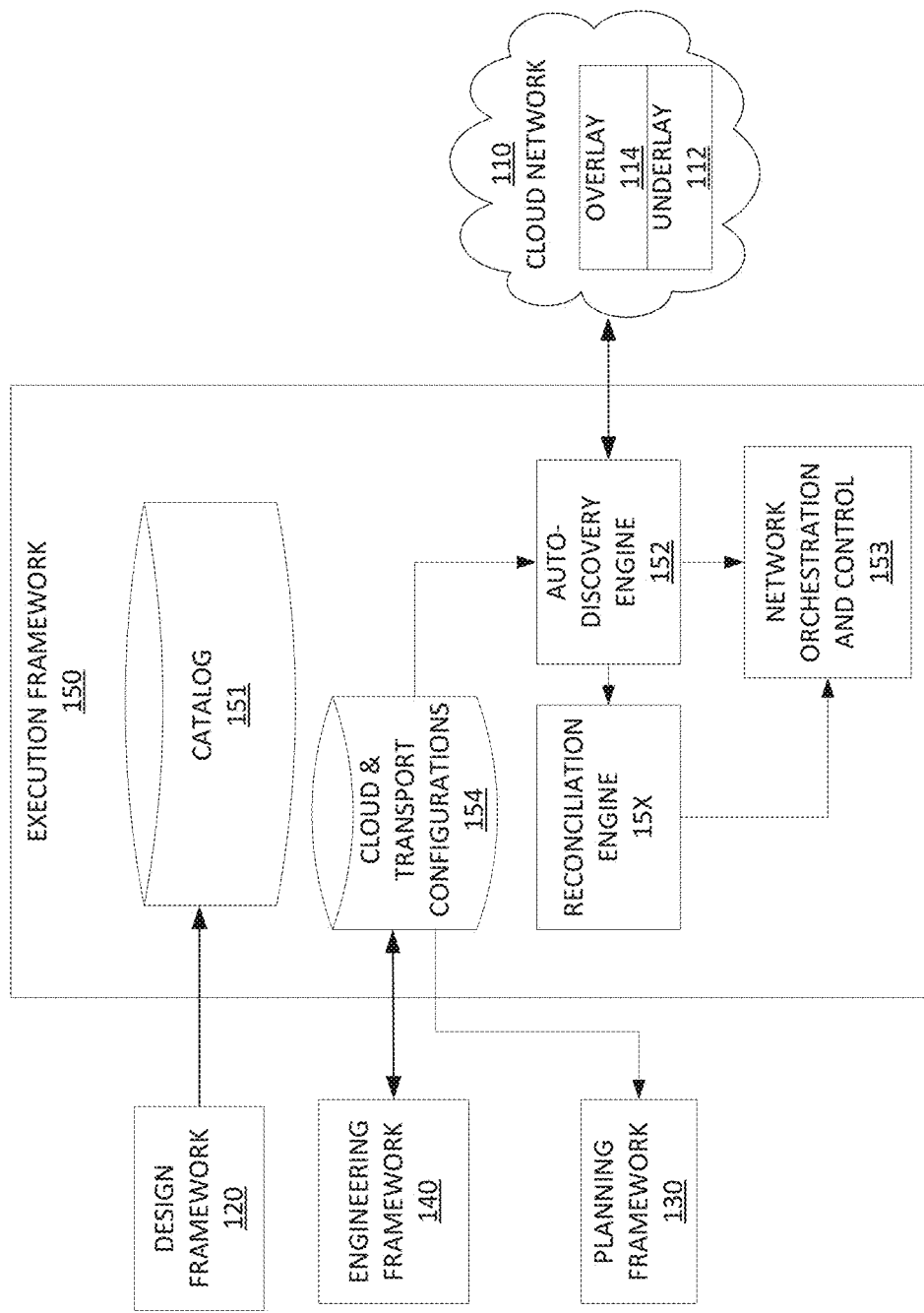

CLOSED-LOOP DEPLOYMENT OF VIRTUAL FUNCTIONS AND CLOUD INFRASTRUCTURE

BACKGROUND

The design and deployment of virtual functions and cloud networks may include a variety of different stages, often performed by different actors. At each of these stages, certain information regarding the functionality, requirements, or design of the virtual functions of cloud networks may be used. However, this information, which may include design guidelines, may not be generally accessible across each stage of the design and deployment process. That is, at various stages, this information may be derived from various sources, rather than from a single source. These disparate and often conflicting information sources may introduce errors in the design and deployment of virtual functions and cloud networks, or may require more manual interference to correct or prevent such errors. This may have negative effects on the deployment process, such as increasing down time for the customers of the cloud network, increased deployment time to launch a cloud service, or the like.

SUMMARY

The disclosed systems, methods, and apparatuses allow for deployment of a virtual function on a cloud network.

In an aspect, this disclosure is directed to a system. The system may include a design framework storing metadata for deploying a virtual function on a cloud network. The system may also include a planning framework communicatively coupled to the design framework, an engineering framework communicatively coupled to the design framework and the planning framework, and an execution framework communicatively coupled to the design framework and the engineering framework. The system may include a processor communicatively coupled to the design framework and memory storing instructions that cause the processor to effectuate operations. The operations may include providing, from the design framework, the metadata to the planning framework, the engineering framework, and the execution framework. The operations may include determining a forecasted growth of at least a portion of a cloud network. The operations may include based on the forecasted growth and the metadata, determining, by the planning framework, a cloud plan and a transport plan. The operations may include based on the metadata and at least one of the cloud plan and the transport plan, determining, by the engineering framework, a network configuration. The operations may include providing, by the engineering framework, the network configuration to the execution framework and, based on the metadata and the network configuration, configuring the cloud network for the virtual function.

In another aspect, this disclosure is directed to a method. The method may include receiving metadata indicative of a design of a virtual function. The method may include determining a forecasted growth of at least a portion of a cloud network. The method may include based on the forecasted growth and the metadata, determining a cloud plan and a transport plan for deploying the virtual function on the cloud network. The method may include based on the metadata and at least one of the cloud plan and the transport plan, determining a network configuration for configuring the cloud network to support the virtual function. The method may include configuring the cloud network for the virtual function based on the metadata and the network configuration.

According to another aspect, this disclosure is directed to a method. The method may include receiving metadata for deploying a virtual function on a cloud network. The metadata may include a recipe, policy, and template. The method may include, based on the metadata, designing a cloud plan and a transport plan for deploying the virtual function on the cloud network to meet a forecasted demand. The method may include determining a network configuration to implement the cloud plan and the network plan based on the metadata and causing the cloud network to be configured using the network configuration. The method may include instantiating the virtual function on the configured cloud network.

BRIEF DESCRIPTION OF THE DRAWINGS

Aspects of the herein virtual function and cloud network deployment system are described more fully herein with reference to the accompanying drawings, in which example embodiments are shown. In the following description, for purposes of explanation, numerous specific details are set forth in order to provide an understanding of the various embodiments. However, the instant disclosure may be embodied in many different forms and should not be construed as limited to the example embodiments set forth herein. Where convenient, like numbers refer to like elements.

FIG. 1E is another schematic of a system for deploying a virtual function on a cloud network.

DETAILED DESCRIPTION

Figure 1A:
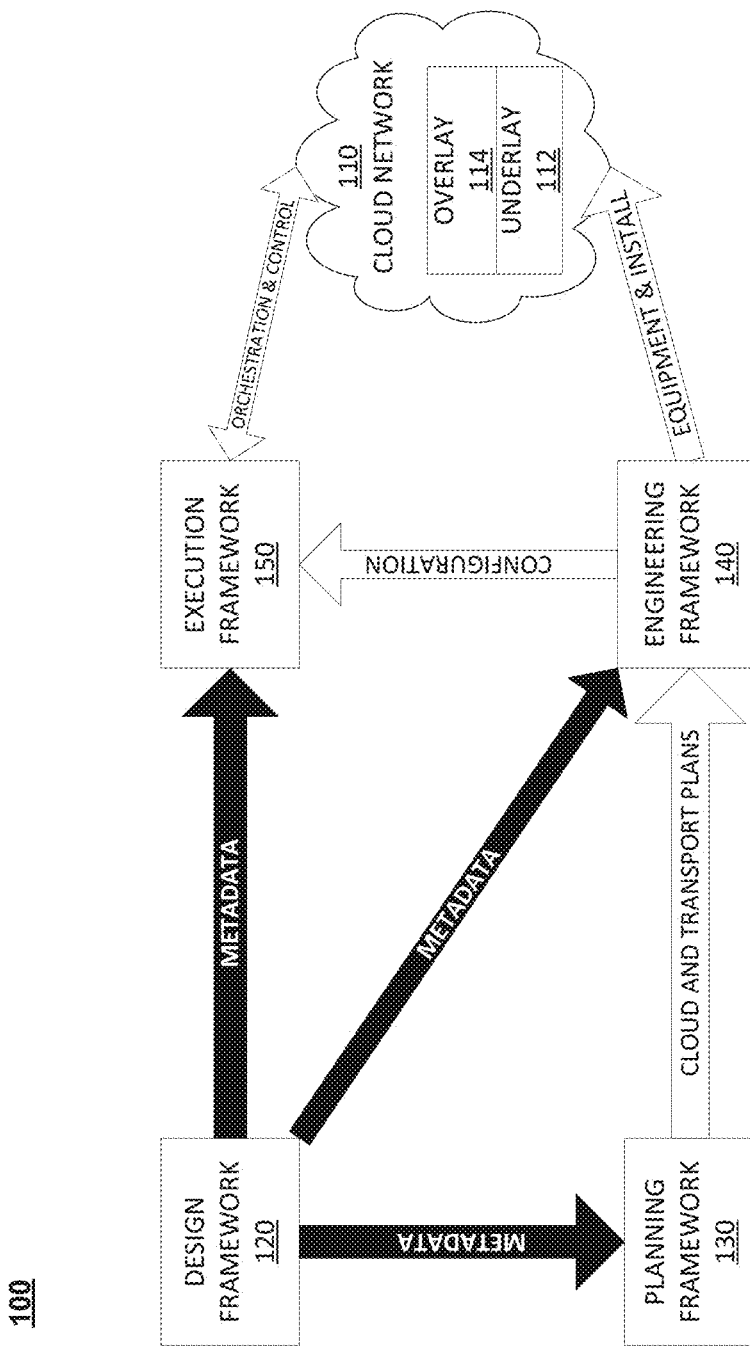
FIG. 1A is a schematic of a system for deploying a virtual function on a cloud network.

FIG. 1A is a high level schematic of a system 100 for deploying a virtual function on cloud network 110. Generally, system 100 may include a design framework 120 for designing the virtual function. This design may include the functionality of the virtual function itself, as well as identifying the network resources of cloud network 110 that the virtual function will need.

System 100 may also include a planning framework 130 for planning how to deploy the virtual function. This may include making determinations about the usage capacity, customer supply/demand, optimizing cloud network to provide for the designed virtual function as well as other virtual functions, and identifying the amount of network resources necessary to deploy enough instances of the virtual function on cloud network 110 to meet market demand. In addition to designing the cloud plan for configuring cloud network 110, planning framework 130 may design a transport plan, which may be used to handle transportation of data within cloud network 110, such as between datacenters.

System 100 may also include a cloud engineering framework ("engineering framework") 140 for planning how to configure cloud network 110 to deploy the virtual function. Engineering framework 140 may be responsible for determining the new equipment required to deploy the virtual function on cloud network 110. Engineering framework 140 may also create a transport routing plan based on the transport plan created by planning framework 130. Engineering framework 140 may be responsible for ordering equipment and installation of services on cloud network 110 to meet the requirements for deploying the virtual function in the desired manner.

System 110 may also include an execution framework 150 may be responsible for the ultimate deployment of the virtual function on cloud network 110. It may impose orchestration and control on all or a portion of cloud network 110. For example, execution framework 150 may discover all or a portion of the resources of cloud network 110 (e.g. underlay 112) and deploy the virtual function as a portion of an overlay 114.

In an aspect, each framework (e.g., design framework 120, planning framework 130, engineering framework 140, execution framework 150) may have its own view of what a component of cloud network 110—including virtual components and network resources—"looks like," including how such components operate. These templates or profiles of components may be customized to match the specific purposes of the framework using those templates. For example, the goal of planning framework 130 may differ from the goal of execution framework 150, but there may be certain overlapping information that both frameworks may use in reaching those goals. Further the information available to one framework may not be as up-to-date or otherwise reliable as the information available to another framework. For example, since execution framework 150 may be responsible for orchestrating and controlling cloud network 110, it may be aware when certain hardware of cloud network 110 (e.g., underlay 112) is being used by another service or is otherwise unavailable. However, unless that information is provided by execution framework 150 to planning framework 130, the capacity planning performed by planning framework 130 may rely on outdated information.

Thus, a central repository of information regarding virtual functions, resources, cloud templates, and other information may be advantageous.

System 100 may provide a holistic approach using a single design framework 120 for rapid and consistent onboarding and rapid deployment of a new virtual function in cloud network 110. The use of a single design framework 120 may eliminate conflicting business rules across the various components of system 100. Instantiation of cloud components and virtual function may thus be delivered consistently and error-free, eliminating or even eradicating negative impacts on customers or end users of cloud network 110 that may be caused by deployment (or downtime) of virtual functions.

Figure 1B:
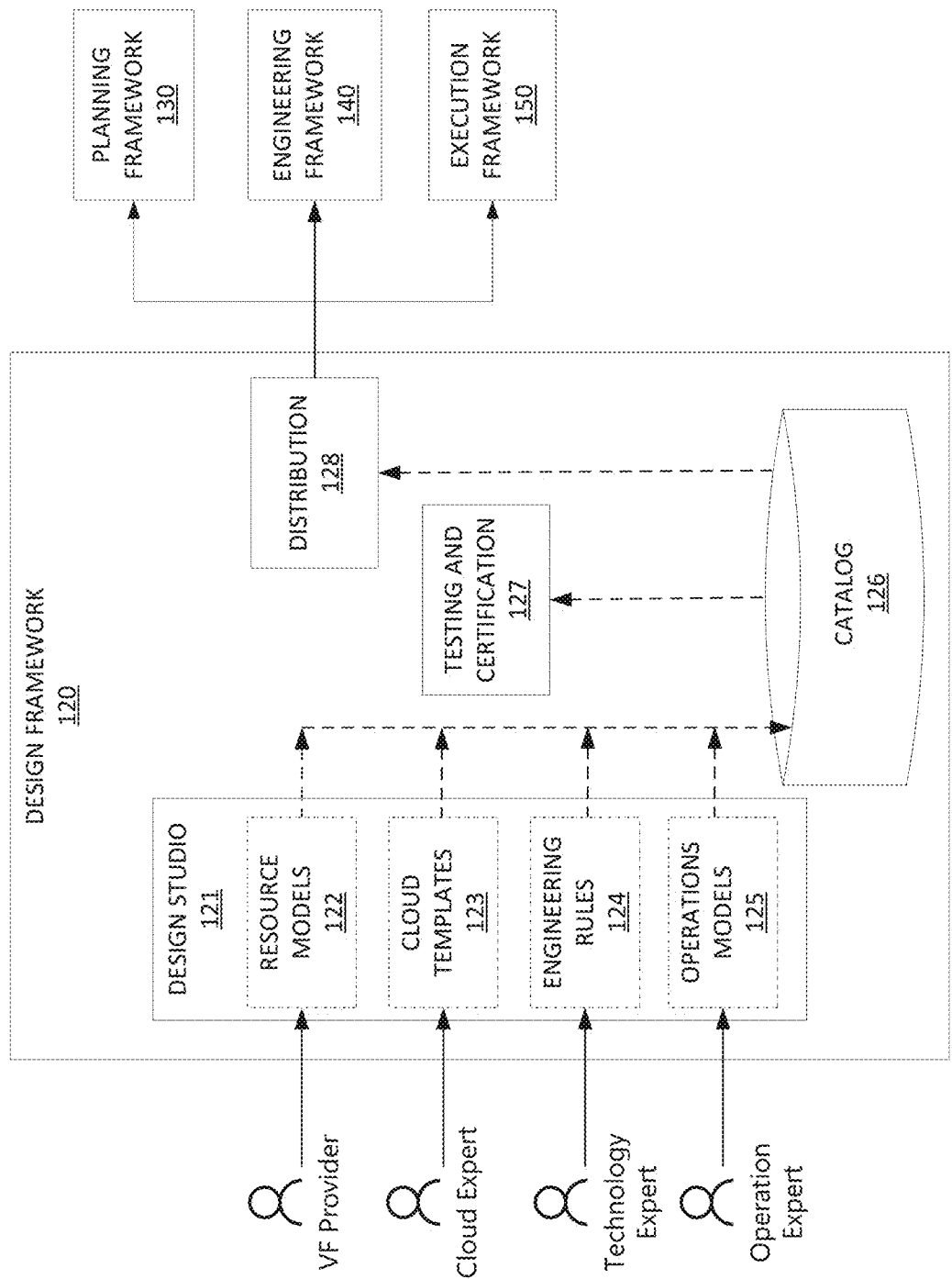
FIG. 1B is another schematic of a system for deploying a virtual function on a cloud network.

Design framework 120 is described with further detail in reference to FIG. 1B. A single design framework 120 may allow a community of service designers, operations users, and planners to consistently and rapidly prototype new services and features, test and certify such services and features, iterate through an agile process, and create lifecycle support for such services and features, and deploy them into function in a coordinated fashion.

Design framework 120 may include a design studio 121. Design studio 121 may prove a catalog-driven visual modeling and design system that builds metadata used to deploy the virtual function and cloud components. This metadata may include recipes, templates, and policies. Design studio 121 may provide a standard way of identifying characteristics of allowable cloud configurations to enable rapid onboarding, validation, certification, and cataloging of virtual functions. Design framework 120 may play a key role in the design phase of the lifecycle of a virtual function. During the design phase, designers and operations users may create the necessary recipes, templates, and rules for instantiation, control data collection, and analysis functions. Policies and their enforcement points (including those associated with the closed-loop automation of portions of the life cycle of the virtual function) may be defied for various service conditions that require a response, along with the actors and their roles in orchestrating the response. This upfront design—which includes not only designing the virtual function but also setting for rules to dictate operation and servicing of that virtual function—ensures that the metadata (e.g., the logic and rules) are codified to describe and manage this closed-loop behavior. In an aspect, this metadata may be stored in a central or distributed catalog. This catalog may be contained within design framework 120 or accessible to design framework 120.

Design studio 121 may comprise an environment in which different aspects may be designed and modeled by operators having different perspectives and goals. For example, virtual function providers may use design studio 121 to model the resource needs of the virtual function being designed as a resource module 122. That is, resource module 122 may model the designed virtual function in terms of the resources needed to instantiate the virtual function. Cloud experts may create cloud templates 123 that identify characteristics of allowable cloud configurations. Technology experts may use design studio 121 to create or upload engineering rules 124. Engineering rules 124 may be guidelines for configuring cloud network 110 (or a generic system) to meet network deployment requirements. Engineering rules 124 may include, but are not necessarily limited to, session rules interface and port rules, context rules, subscriber rules, service rules, access rules, or the like. Engineering rules 124 may pertain to a specific portions of or the entirety of underlay 112, such as an operating system, component, or platform of cloud network 110. Operations experts may use design studio 121 to upload or create operations models 125. Operation model 125 may define requirements for cloud network 110 such as governance, privacy, security, operations, management, support, and monitoring. Design framework 120 may store these models, rules, and templates (generally, metadata) in a catalog 126. Design framework 120 may also include at least one testing and certification module 127 that may verify that there are no conflicts among the metadata, or that deployment of a given virtual function is possible without conflicting with this metadata. All or a portion of the contents of catalog 126 may be shared with other frameworks during the deployment process. A distribution 128 of design framework 120 may be responsible for distributing metadata from catalog 126 to the other frameworks.

Figure 1C:
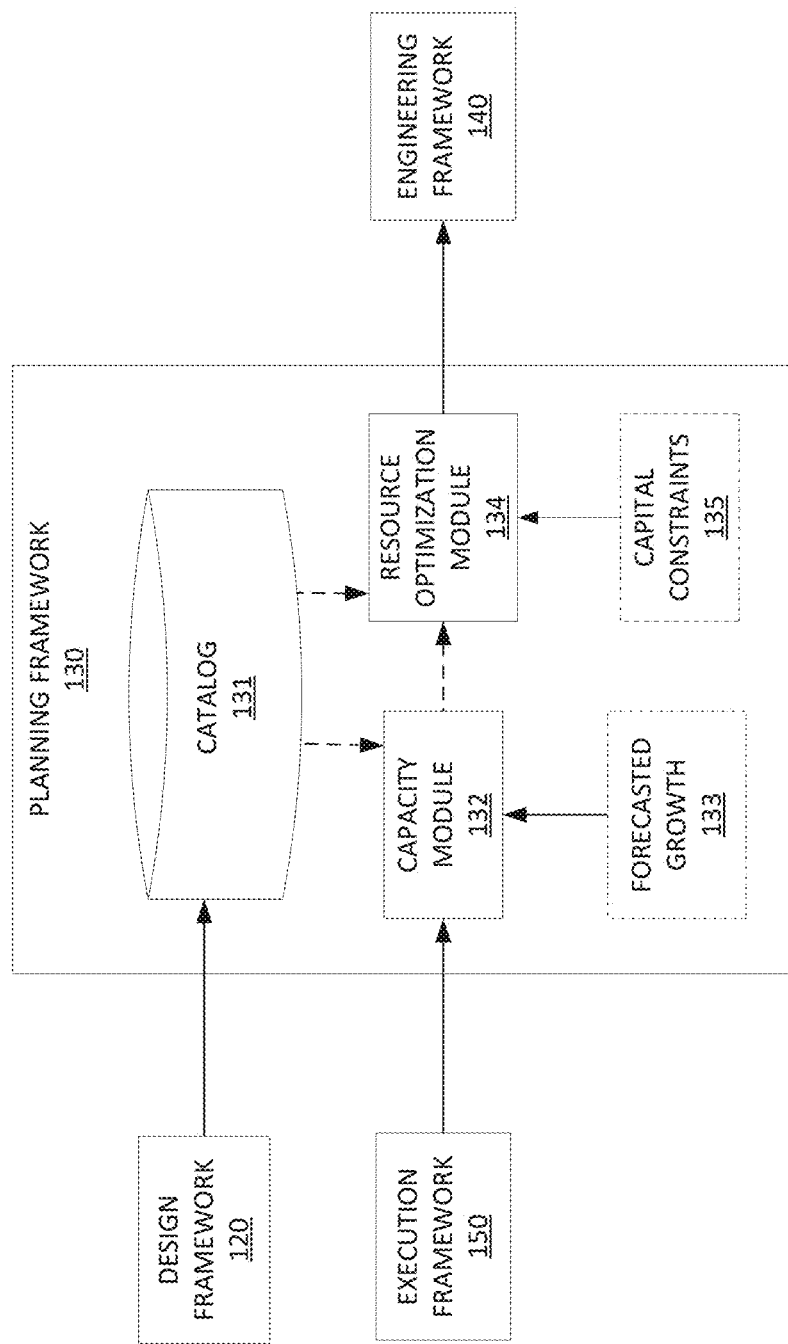
FIG. 1C is another schematic of a system for deploying a virtual function on a cloud network.

Planning framework 130 of system 100 is described in more detail with reference to FIG. 1C. As discussed in reference to FIG. 1B, distribution module 128 distributes metadata stored in catalog 126 of design framework 120 to planning framework 130. For example, this metadata may include or indicate the requirements and specifications of the virtual function, how the load or demand of the virtual function may affect the platform or underlay 112, configurations for standard cloud compute storage and networking templates, or transport cost models. Planning framework 130 may store this metadata in its catalog 131. Planning framework 130 may use this metadata to create a cloud plan and a transport plan for deploying the virtual function on cloud network 110.

Creating the cloud plan or the transport plan may consider other data. For example, planning framework 130 may have a capacity module 132 that may be used to determine the virtual function capacity sizing by location and inter-connectivity between locations. That is, capacity module 132 may determine how much capacity a certain number of (e.g. a single) instances at a given location may support, and the geographic area in which those users of that instance may extend. This capacity determination may not be determined in a vacuum. It may depend upon the design specifications of that virtual function, and how much capacity a single instance may support. For example, it may be determined using the recipes that define the resource model, virtual function behavior, features, hardware specification, and restoration requirements contained in the metadata. Additionally or alternatively, it may depend, for example, on forecasted growth 133 in that given geographic area. It may depend, as another example, on interconnectivity between the location where that virtual function may be instantiated and the associated geographic area. It may also depend, as yet another example, on the capacity and usage of cloud network 110. This third category of data, which may include indications of the resource capacity and configuration of cloud network 110 or the traffic pattern and capacity history of cloud network 110, may be derived from data collected or analyzed by execution framework 150. As discussed earlier, execution framework 150 may be responsible for monitoring the operation of services on cloud network 110, and this closed-loop feedback system may be used to optimize or alter the implementation of other virtual functions.

Given the constraints of the virtual function (e.g., from design framework 120) and the constraints and demands of cloud network 110 (e.g., from execution framework 150), capacity module 123 may determine the capacity of the virtual function operating within cloud network 110. However, it may not be enough to simply implement the virtual function in any place within cloud network 110 that it may fit. Thus, planning framework 130 may be responsible for optimizing resources of cloud network 110, such as by a resource optimization module 134.

Ideally, cloud network 110 may be able to support as many instantiations of the virtual function to be deployed to meet the expected demand, and those instantiations may be located as close to the demand as possible to the end users, to decrease costs and time spent transporting data from remote locations. However, practical restraints, including the current or expected usage of cloud network 110's resources by other virtual resources, and the costs associated with expanding cloud network 110, present an optimization problem. Thus, a resource optimization module 134 may consider the virtual function capacity, the demand on cloud network 110 from other virtual functions or other sources, and capital constraints 135 that may limit how much cloud network 110 may be expanded. With these constraints taken into consideration, resource optimization module may determine how and where to instantiate the virtual function within cloud network 100. This plan may include, if permissible, reallocating certain resources from other virtual functions to the virtual function to be deployed. In this sense, resource optimization module 134 may develop one or more plans, such as a cloud plan and a transport plan that may be used to deploy the virtual function. Planning framework 130 may provide these cloud or transport plans to engineering framework 140.

Planning framework 130 may optimize holistically the required cloud resources and networking augments or buildouts to meet the virtual function capacity needs using the metadata (e.g., recipes) from design framework 120, which may include policies regarding virtual function affinity rules, latency requirements, survivability analysis, and transport cost. In addition to capacity sizing, planning framework 130 may account for other areas such as business and operational systems moving to the cloud environment. In an aspect, planning framework 130 may allow users to select the most feasible solution based on experience and affordability. Additionally or alternatively, planning framework 130 may select a feasible solution without user input.

Figure 1D:
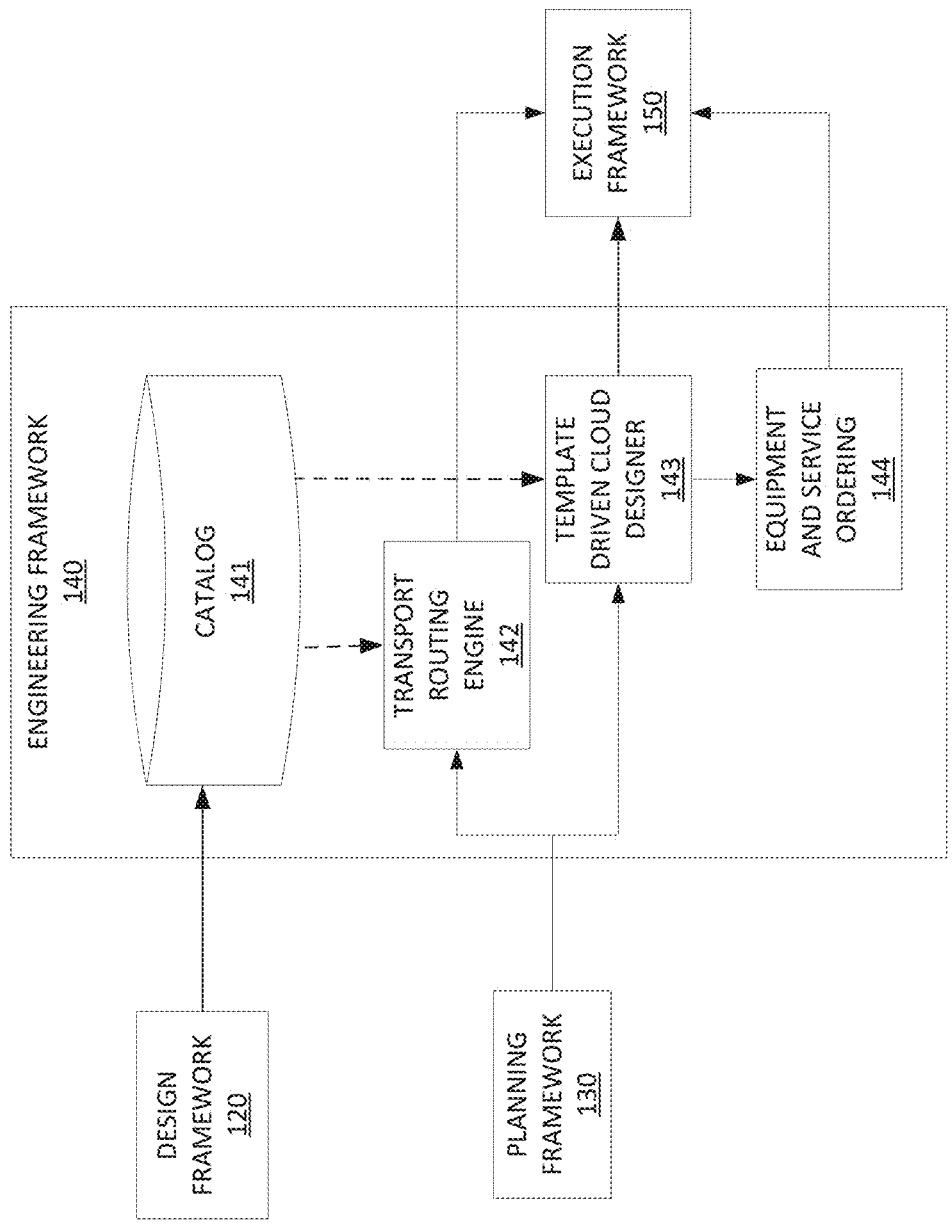
FIG. 1D is another schematic of a system for deploying a virtual function on a cloud network.

Engineering framework 140 of system 100 is described in more detail with reference to FIG. 1D. Engineering framework 140 may design the planned augments or build-out of the cloud infrastructure resources and necessary connectivity. As discussed in reference to FIG. 1B, distribution module 128 distributes metadata stored in catalog 126 of design framework 120 to engineering framework 140. Engineering framework 140 may store that metadata received from design framework 120 in a catalog 141. This metadata may include catalog information on allowable vendor technologies (e.g., servers, storage, switches, routers), naming conventions, and design templates for specific configurations. Engineering framework 140 may also receive information from planning framework 130. For example, planning framework 130 may provide the cloud plan or transport plan created within planning framework 130. A transport routing engine 142 of engineering framework 140 may use the transport plan from planning framework 130 along with the metadata of catalog 141 (that originated from design framework 120) to create a transport routing plan. Engineering framework 140 may provide the transport routing plan to execution framework 150. Engineering framework 140 may use the cloud plan received from planning framework 130, along with the metadata stored in catalog 141 (that originated from design framework 120) to design or alter cloud network 110 using a template-driven cloud designer 143. Template-driven cloud designer 143 may compare the actual configuration or content of cloud network 110 with the cloud plan from planning framework 130 to determine whether additional equipment or services need to be integrated into cloud network 110. Thus, template-driven cloud designer 143 may receive information indicative of the content or structure of cloud network 110 from execution network 150. Based on this information, engineering framework 140 may communicate equipment or services that need to be ordered or installed in cloud network 110 with an equipment and service ordering module 144. Further, engineering framework 140 may communicate planned resources and configuration of cloud network 110 developed by equipment and service ordering module 144 in conjunction with the equipment and services ordered. That is, once the design is approved, engineering framework 140 may order installation services and equipment to complete the augmentation or build out of cloud network 110.

Execution framework 150 of system 100 is described in more detail with reference to FIG. 1E. As discussed in reference to FIG. 1B, distribution module 128 distributes metadata stored in catalog 126 of design framework 120 to execution framework 150. Execution framework 150 may store this metadata in a catalog 151. While not necessarily shown in FIG. 1E, catalog 151 may be in communication with the other elements of execution framework 150, and the templates, recipes, and policies in catalog 151 that originate from design framework 120 may dictate the behavior of execution framework 150.

Execution framework 150 may include an auto-discovery engine 152 to discover new hardware and connectivity in cloud network 110. The auto-discovery engine 152 may monitor cloud network 110, which may facilitate a network orchestration and control engine 153 of execution framework 150 configuring overlay 114 and underlay 112 of cloud network 110.

Execution framework 150 may receive information from engineering framework 140. This information from engineering framework 140 may include planned resources and configurations created by template-driven cloud designer 143. This information from engineering framework 140 may include transport routing plans created by transport routing engine 142. Execution framework 150 may store information from engineering framework 140 in a cloud and transport configurations catalog 154.

Execution framework 150 may include a reconciliation engine 155 to reconcile the design view (e.g., the metadata from design framework 120, cloud/transport plans from planning framework 130) to the discovered as-built cloud and infrastructure discovered by auto-discovery engine 152. Creation, configuration, and testing of overlay 114 and underlay 112 may be done using the recipes and policies (e.g., metadata) from design framework 120 stored in catalog 151.

Design framework 120, engineering framework 130, planning network 140, and execution framework 150 work in conjunction to manage cloud network 110 and deploy the virtual function on cloud network 110. To create a cohesive process, each framework uses the recipes, templates, and policies distributed by design framework 120.

Figure 2:
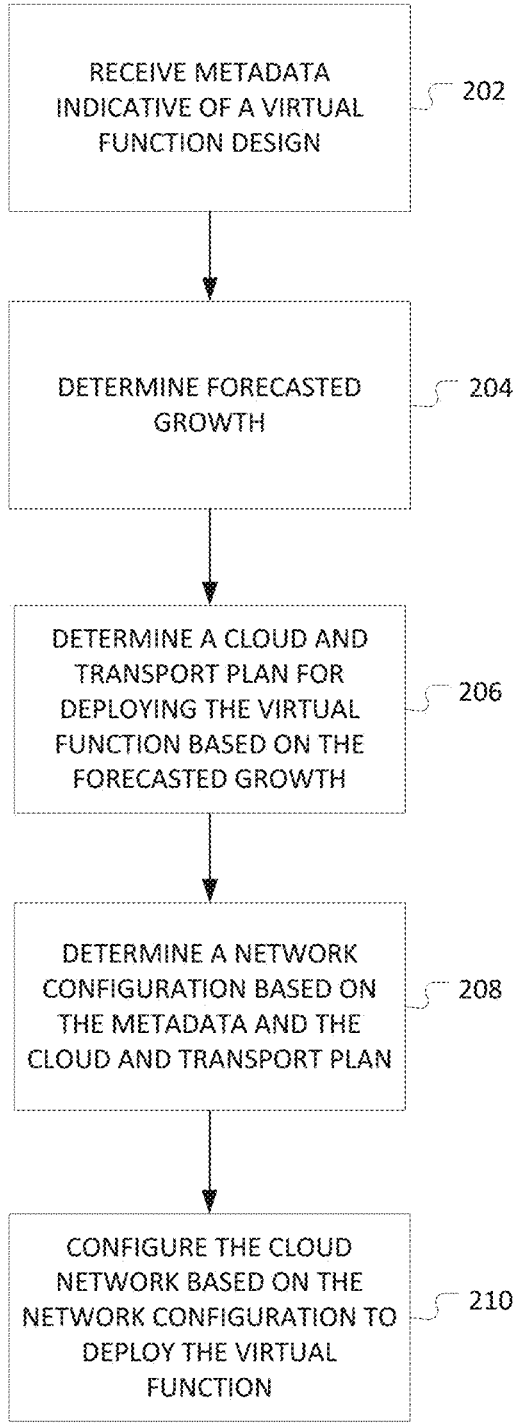
FIG. 2 is a flowchart of an exemplary method or deploying a virtual function on a cloud network.

FIG. 2 is a flowchart of an exemplary method 200 for deploying a virtual function on cloud network 110.

At step 202, method 200 may include receiving metadata for deploying a virtual function on cloud network 110. This metadata may indicate a design of the virtual function. For example, the metadata may include recipes, policies, and templates, such as the requirements or specifications of the virtual function, the management recipes and policies of the virtual function, the recipes of the cloud resources (e.g., network hardware, software, connectivity), transport provisioning recipes, cloud data models, transport data models, templates for standard computing, storage, and networking of cloud network 110, transport cost models, the load/demand of the virtual function on cloud network 110, or the like. This metadata may be updated, such as based on changes to cloud network 110. For example, as new equipment or services are installed in cloud network 100, the metadata may be updated to include models, templates, policies, or recipes that describe or incorporate such new equipment or services. Metadata may be received at the frameworks of system 100. For example, design framework 120 may distribute the metadata to the planning framework 130, the engineering framework 140, and the execution framework 150. Further, the content of the metadata may be updated based on feedback received at design framework 120 from execution framework 150.

At step 204, method 200 may include determining a forecasted growth affecting cloud network 110, such as a forecasted demand of services or resources on cloud network 110 or a portion of cloud network 110. The forecasted demand may include a predicted demand for the virtual function, for example. The forecasted demand may compare a predicted demand for the virtual function to be deployed to other virtual functions or services, such as virtual functions already deployed on cloud network 110. For example, this step may be performed by planning framework 130.

At step 206, method 200 may include determining or design a plan for the cloud or transport to deploy the virtual function on cloud network 110. The cloud/transport plan(s) may be based on the metadata received at step 206. Further the cloud/transport plan(s) may factor in the forecasted growth or forecasted demand. For example, this may include allocating resources of one virtual function to the virtual function to be deployed, such as based on relative forecasted demands. As discussed above, the cloud/transport plan(s) may be determined based on optimizing the usage of limited resources of cloud network 110. For example, this step may be performed by planning framework 130.

At step 208, method 200 may include determining a network configuration that will enable implementation of the cloud/transport plan(s) on cloud network 110. The network configuration may use the metadata received at step 202 to make this determination. This may include reconciling the design view indicated by the metadata with a structure of cloud network 110 or the network configuration. For example, this step may be performed by engineering framework 140.

At step 210, method 200 may include configuring cloud network 110 according to the network configuration. This configuration may enable or facilitate the operation of the virtual function on cloud network 110. For example, this configuring of cloud network 110 may include deploying the virtual function. It may include allocating resources of cloud network 110 to the virtual function. It may include installation of new equipment or services on cloud network 110. This step may be performed by execution framework 150. Configuring cloud network 110 may include sensing a current configuration of cloud network 110, comparing the current configuration to the network configuration determined at step 208, and changing the current configuration to match the network configuration. Configuring cloud network 110 may include instantiating or installing the virtual function. Additionally or alternatively, method 200 may include instantiating the virtual function on the configured cloud network as an additional step.

Figure 3:
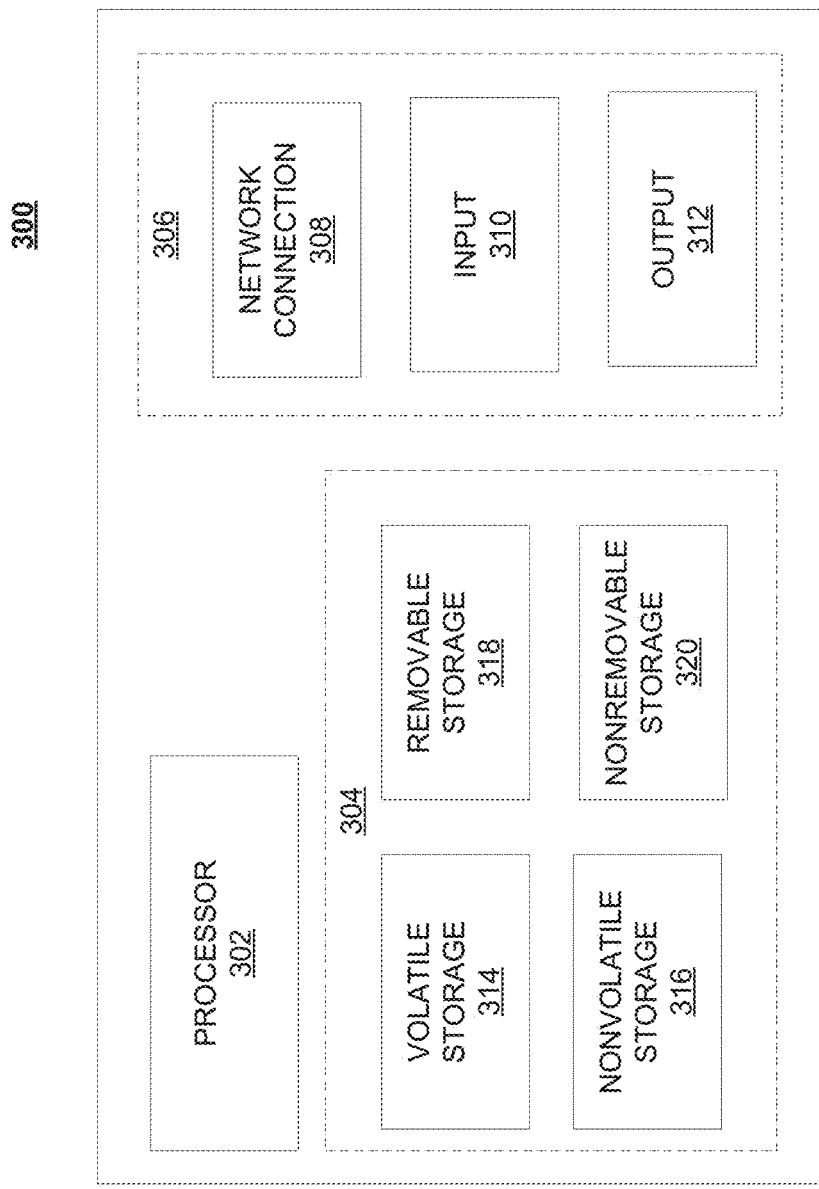
FIG. 3 is a schematic of an exemplary device that may be a component of the system of FIG. 1A, 1B, 1C, 1D, or 1E.

FIG. 3 is a block diagram of network device 300 that may be connected to or comprise a component of system 100. For example, network device 300 may implement one or more portions of method 200 for placement of network components of application 102. Network device 300 may comprise hardware or a combination of hardware and software. The functionality to facilitate telecommunications via a telecommunications network may reside in one or combination of network devices 300. Network device 300 depicted in FIG.

3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications therebetween. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
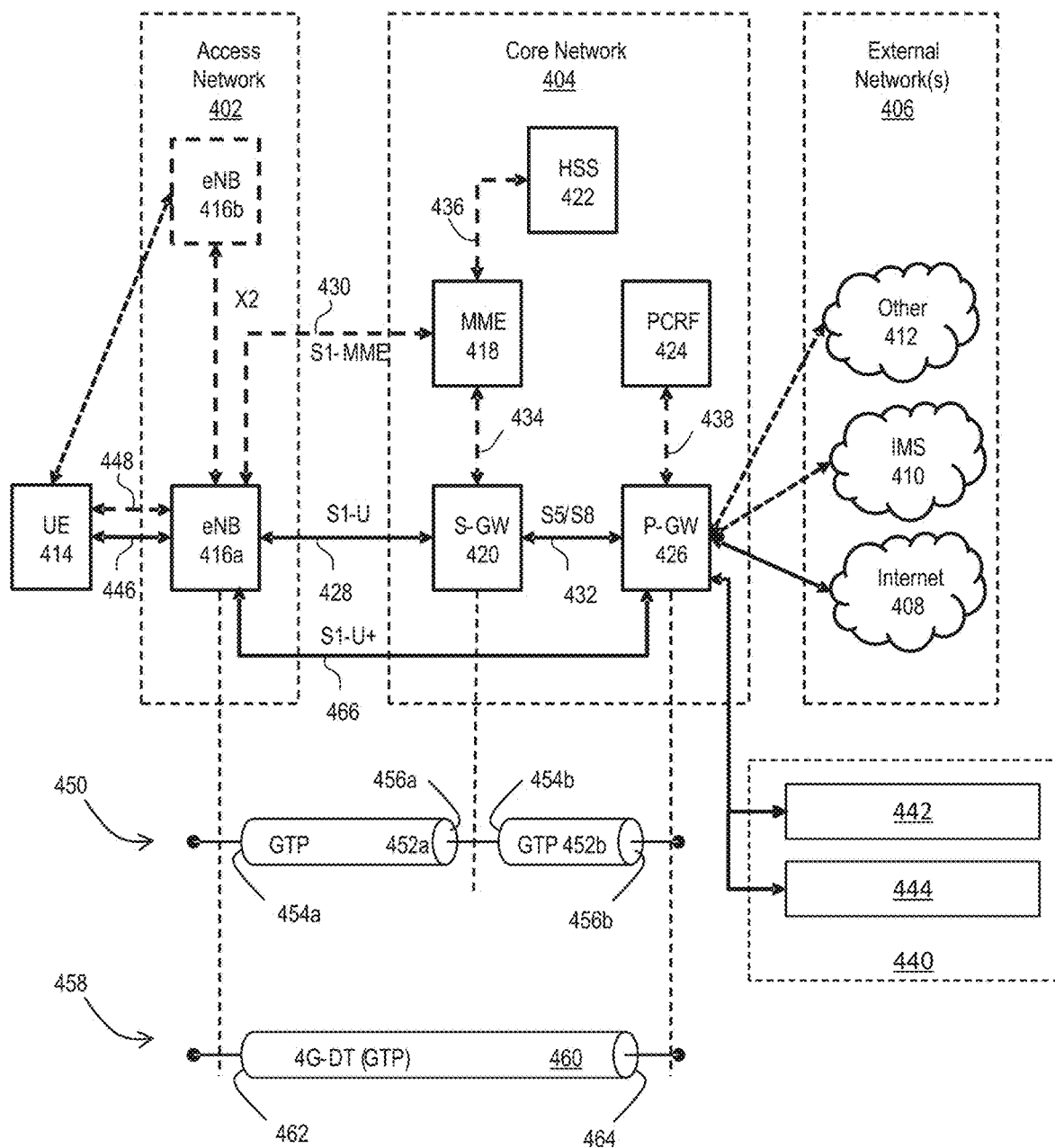
FIG. 4 illustrates a functional block diagram depicting an exemplary network architecture.

FIG. 4 illustrates a functional block diagram depicting one example of an LTE-EPS network architecture 400 that may be at least partially implemented as using virtualized functions. Network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. LTE-EPS network architecture 400 may include an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 405 may include or communicate with system 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
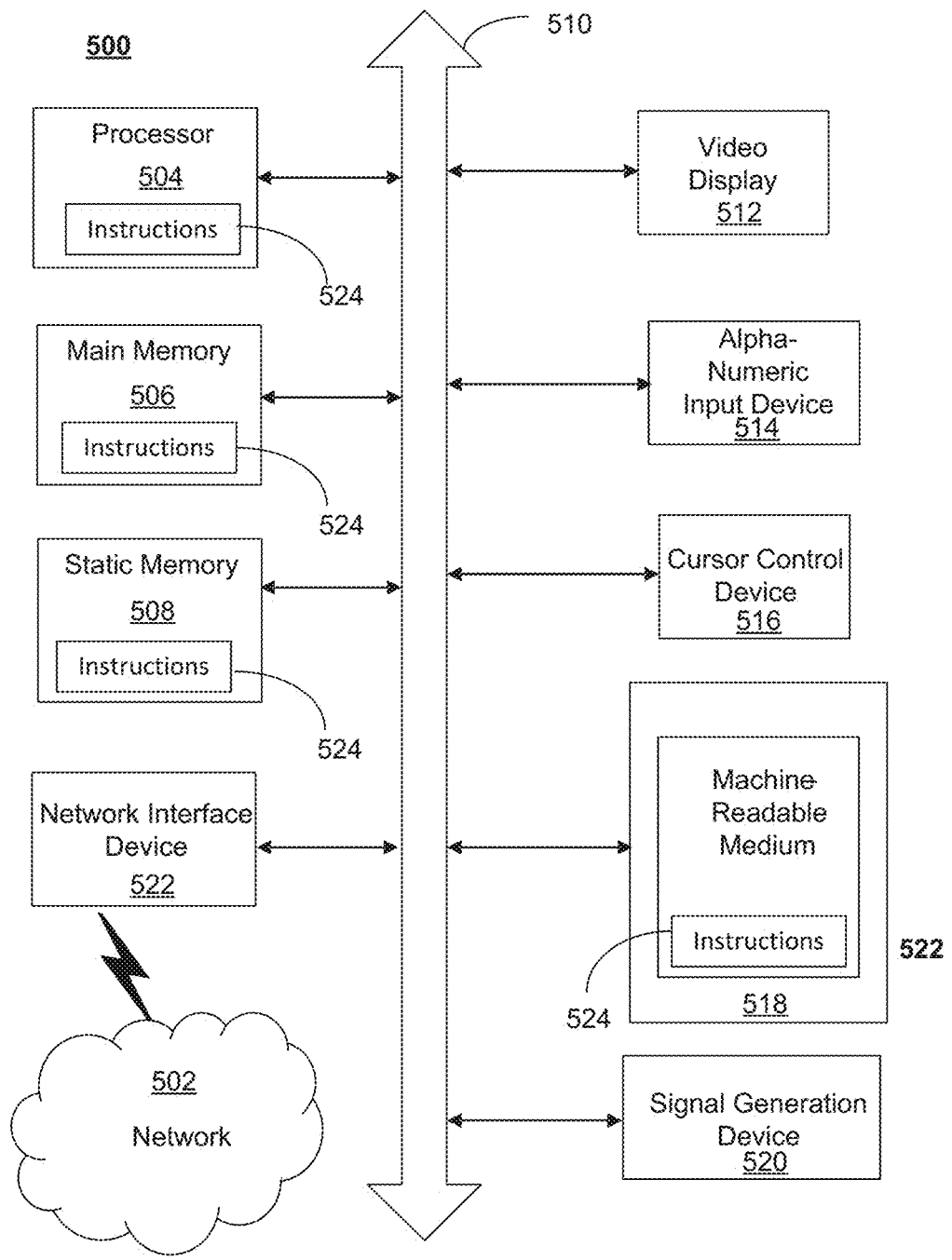
FIG. 5 depicts an exemplary diagrammatic representation of a machine in the form of a computer system.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
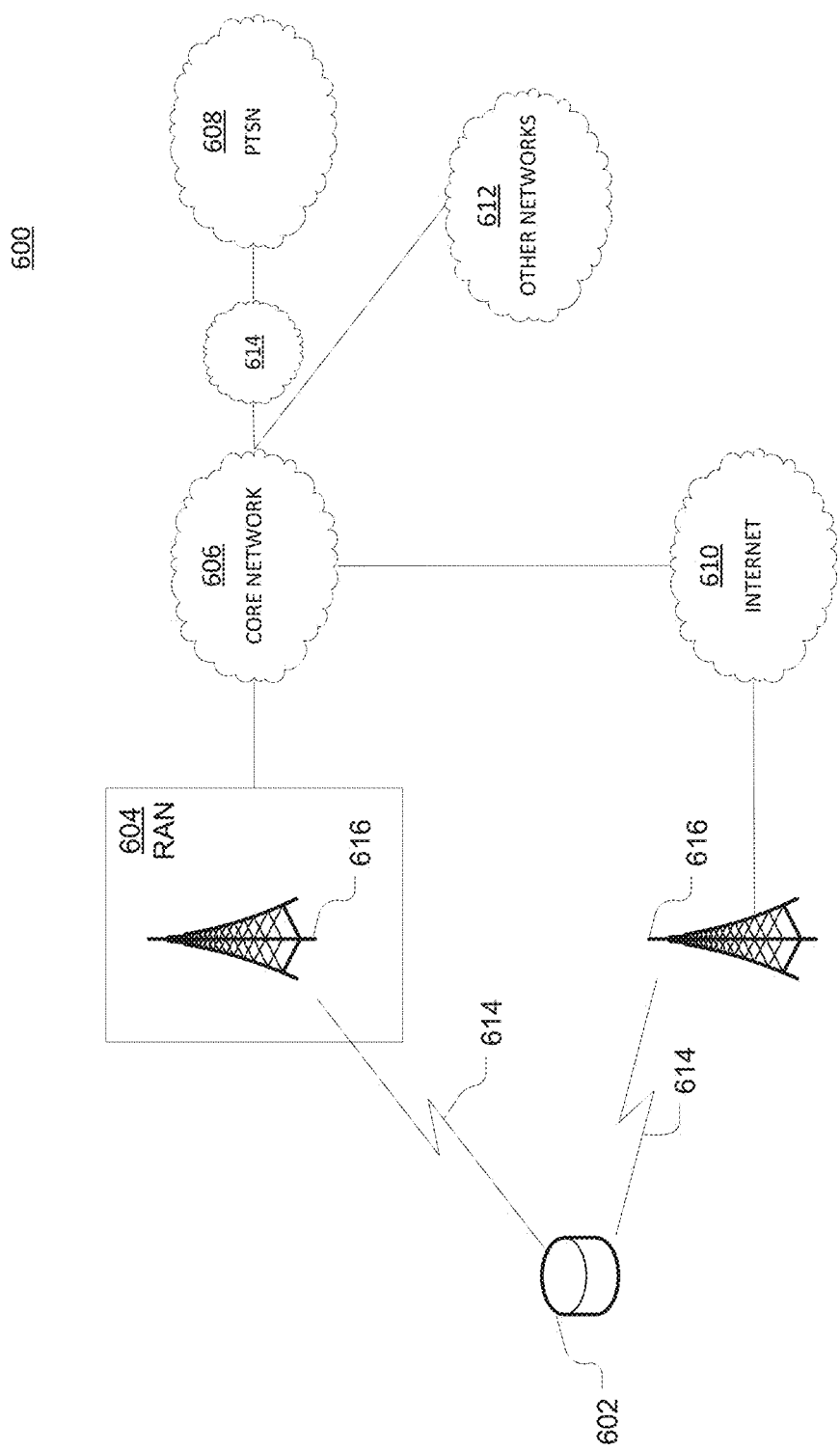
FIG. 6 is a diagram of an exemplary telecommunications system in which the disclosed systems or methods may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
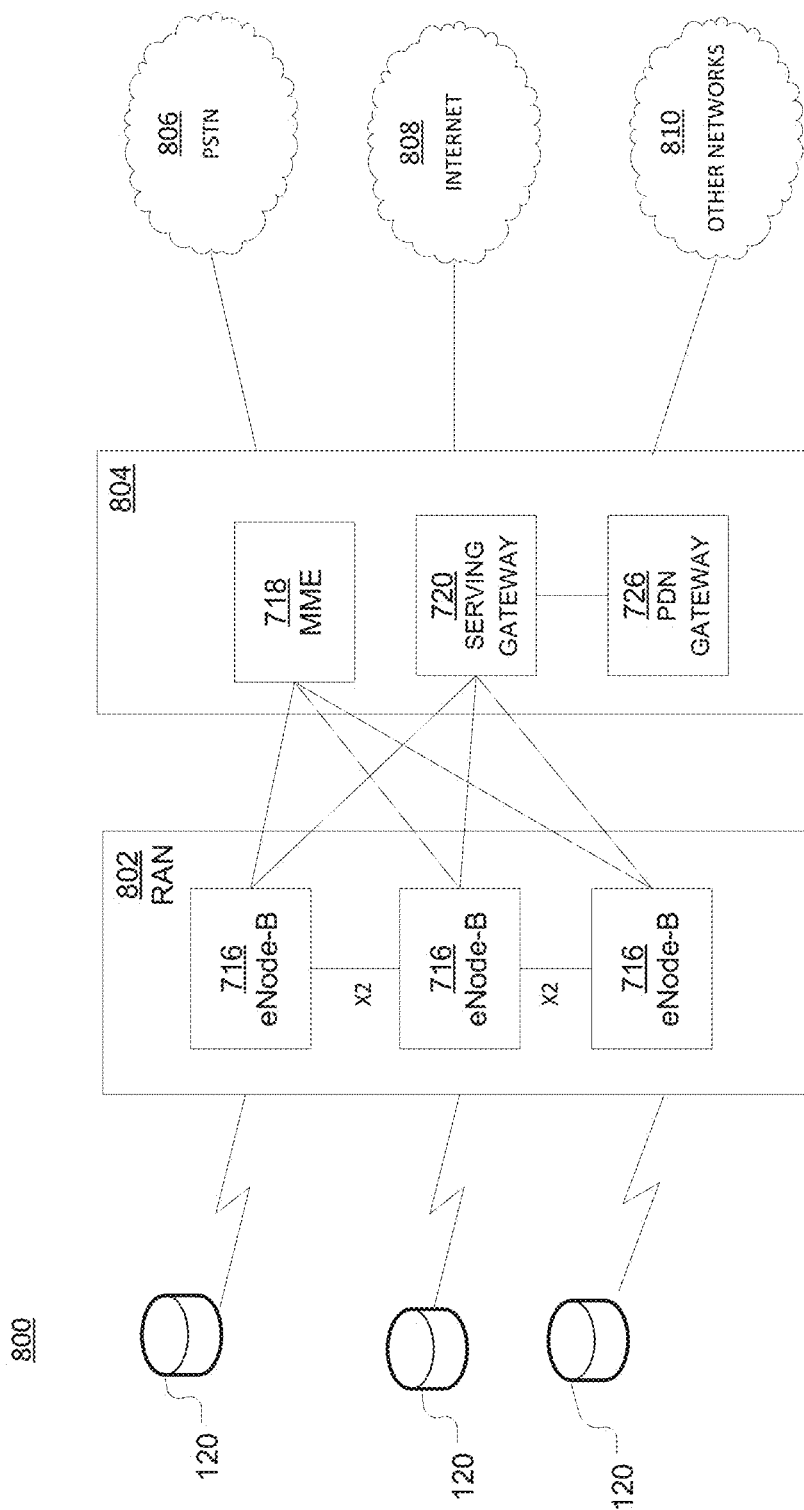
FIG. 7 is an example system diagram of a radio access network and a core network upon which an application may be deployed using the disclosed systems or methods.

FIG. 7 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
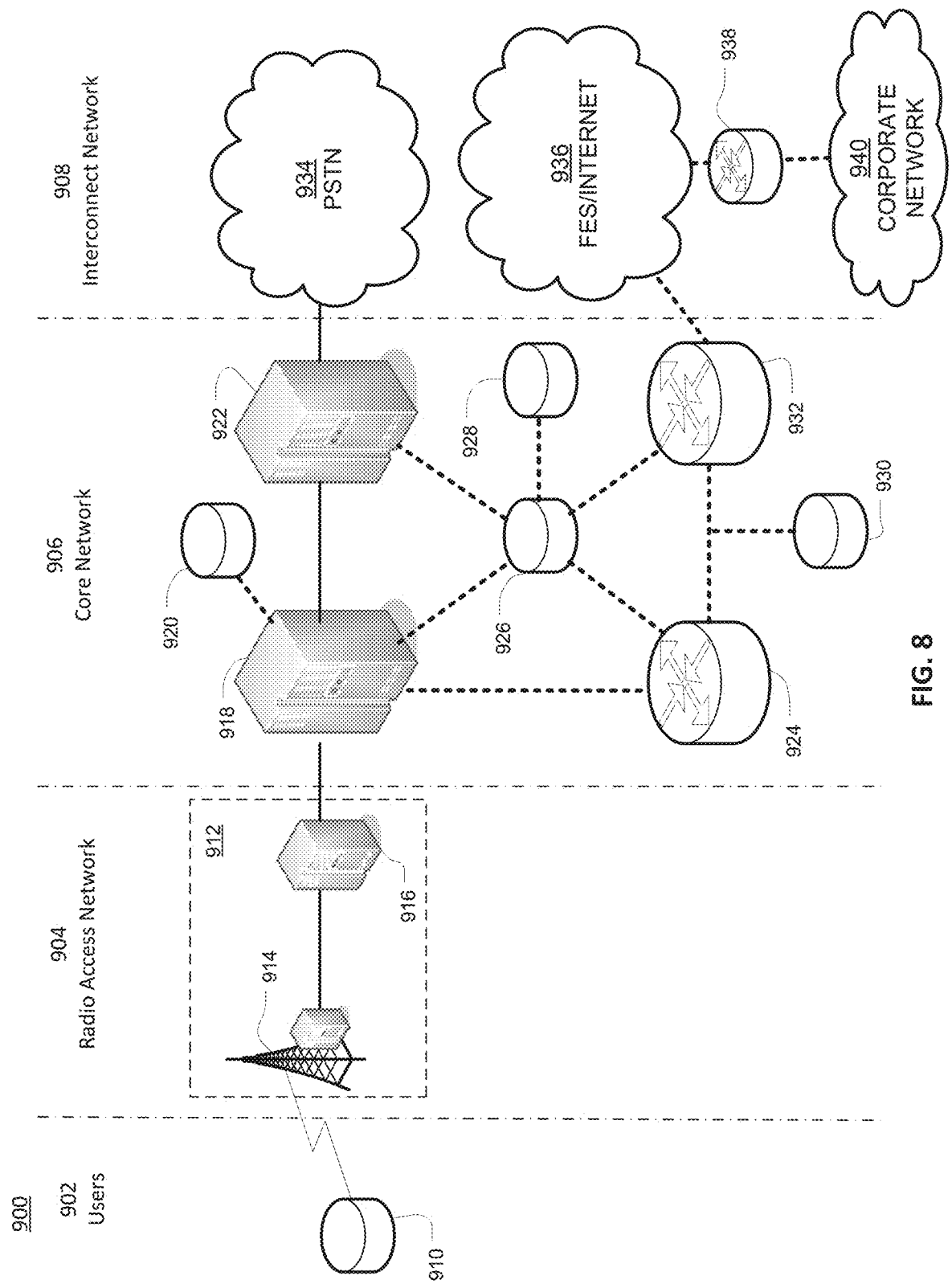
FIG. 8 illustrates an architecture of a GPRS network.

FIG. 8 illustrates an architecture of a typical GPRS network 900 as described herein. The architecture depicted in FIG. 8 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 8. In an example, device 910 comprises a communications device (e.g., device 120, network device 300, or the like, or any combination thereof). Radio access network 904 comprises a plurality of BSSs such as BSS 912, which includes a BTS 914 and a BSC 916. Core network 906 may include a host of various network elements. As illustrated in FIG. 8, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 8, interconnect network 908 comprises a PSTN 934, an FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 8, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 9:
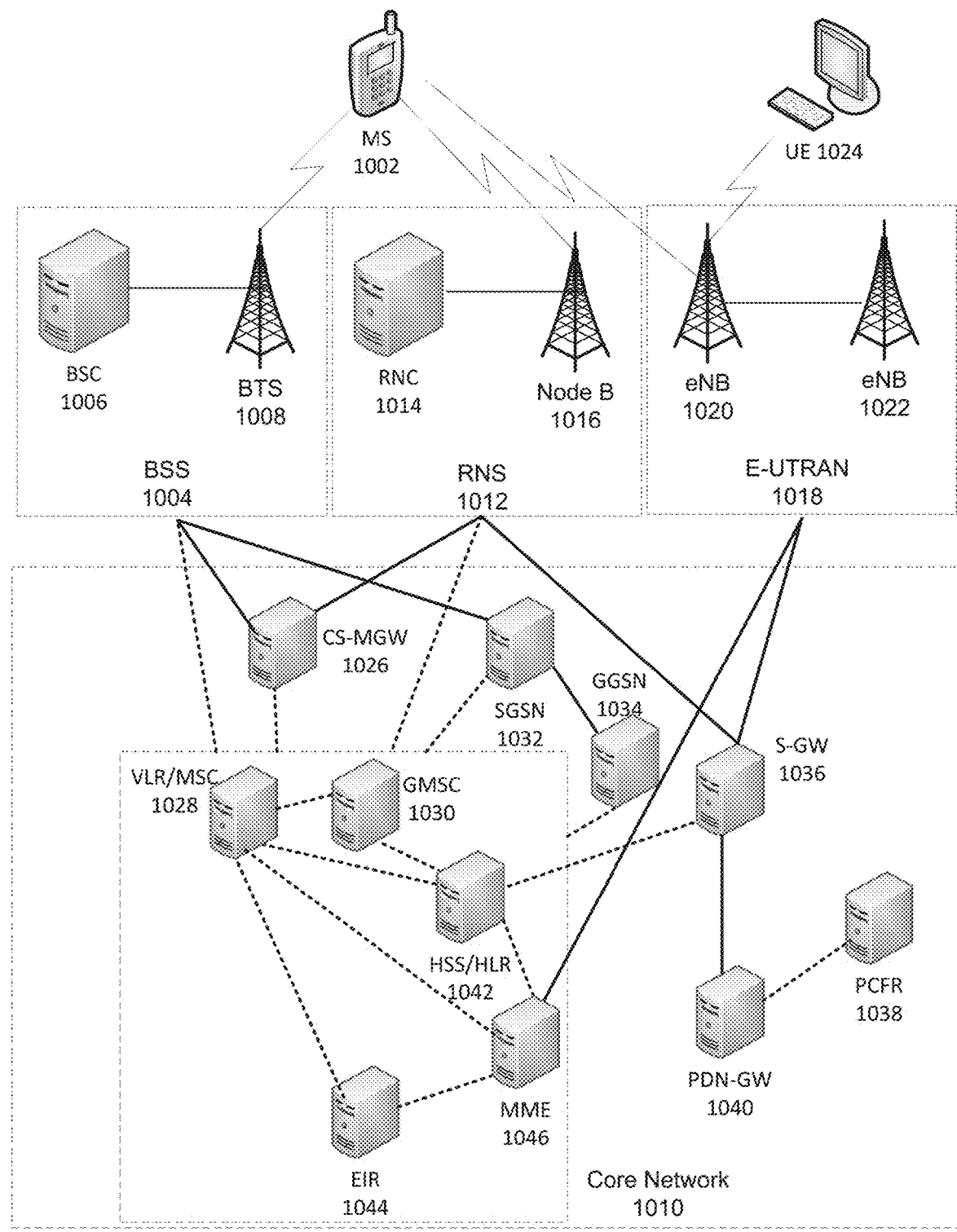
FIG. 9 illustrates a PLMN block diagram view of an example of an architecture that may be replaced by a telecommunications system.

FIG. 9 illustrates a PLMN block diagram view of an example architecture that may be replaced by a telecommunications system. In FIG. 9, solid lines may represent user traffic signals, and dashed lines may represent support signaling. MS 1002 is the physical equipment used by the PLMN subscriber. For example, device 120, vehicle 103, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location data such as, but not limited to, GGSN address for each GGSN 1034 where an active PDP exists. GGSN 1034 may implement a location register function to store subscriber data it receives from SGSN 1032 such as subscription or location data.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location data. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location data to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

While examples of a telecommunications system in which virtual functions can be deployed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

What is claimed:

1. A method comprising:
   receiving metadata for deploying a virtual function on a cloud network, the metadata comprising a recipe, policy, and template;
   determining whether deployment of the virtual function is possible without conflicting with the metadata;
   based on the determination that the deployment of the virtual function is possible without conflicting with the metadata, designing a cloud plan and a transport plan for deploying the virtual function on the cloud network to meet a forecasted demand, wherein designing the cloud plan and the transport plan comprises allocating resources of the cloud network using a comparison of a predicted demand for the virtual function to a current demand for a second virtual function;
   determining, based on the metadata, a network configuration to implement the cloud plan and the transport plan;
   causing the cloud network to be configured using the network configuration; and
   instantiating the virtual function on the configured cloud network.

2. The method of claim 1, wherein configuring the cloud network comprises detecting a current configuration of the cloud network and implementing a change to the current configuration based on the network configuration.

3. The method of claim 2, further comprising updating the metadata based on the current configuration.

4. The method of claim 1, further comprising installing a new resource on the cloud network to satisfy the network configuration.

5. The method of claim 1, wherein the metadata comprises requirements and specifications of the virtual function.

6. A system comprising:
   a design framework having metadata for deploying a virtual function on a cloud network, the metadata comprising a recipe, a template, and a policy;
   a planning framework communicatively coupled to the design framework;
   an engineering framework communicatively coupled to the design framework and the planning framework;
   an execution framework communicatively coupled to the design framework and the engineering framework;
   a processor communicatively coupled to the design framework; and
   memory storing instructions that cause the processor to effectuate operations, the operations comprising:
   determining, by the design framework, whether deployment of the virtual function is possible without conflicting with the metadata;
   based on the determination that the deployment of the virtual function is possible without conflicting with the metadata, providing, from the design framework, the metadata to the planning framework, the engineering framework, and the execution framework;
   determining a forecasted growth of at least a portion of the cloud network;
   based on the forecasted growth and the metadata, determining, by the planning framework, a cloud plan and a transport plan;
   based on the metadata and at least one of the cloud plan and the transport plan, determining, by the engineering framework, a network configuration;

providing, by the engineering framework, the network configuration to the execution framework; and configuring the cloud network for the virtual function based on the metadata and the network configuration.

7. The system of claim 6, wherein the at least one of the recipe, the template or the policy comprises a rule for instantiation or control of the virtual function.

8. The system of claim 6, wherein the metadata comprises a design view of the virtual function and wherein the operations further comprising:

discovering, by the execution framework, the network configuration;

reconciling the design view with the network configuration to create a reconciled design view;

wherein configuring the cloud network for the virtual function was further based on the reconciled design view.

9. The system of claim 6, the operations further comprising: deploying the virtual function on the configured cloud network.

10. The system of claim 6, wherein configuring the cloud network comprises allocating at least the portion of the cloud network to the virtual function.

11. The system of claim 6, wherein the metadata comprises an affinity rule associated with the virtual function.

12. A method comprising:

receiving metadata indicative of a design of a virtual function;

determining whether deployment of the virtual function is possible without conflicting with the metadata;

based on the determination that the deployment of the virtual function is possible without conflicting with the metadata, determining a forecasted growth of at least a portion of a cloud network;

based on the forecasted growth and the metadata, determining a cloud plan and a transport plan for deploying the virtual function on the cloud network;

based on the metadata and at least one of the cloud plan and the transport plan, determining a network configuration for configuring the cloud network to support the virtual function; and configuring the cloud network for the virtual function based on the metadata and the network configuration.

13. The method of claim 12, wherein the network configuration comprises a network service and configuring the cloud network comprises installing the network service.

14. The method of claim 12, wherein configuring the cloud network comprises deploying the virtual function on the cloud network.

15. The method of claim 12, wherein configuring the cloud network comprises allocating at least the portion of an underlay of the cloud network to the virtual function.

16. The method of claim 12, wherein the metadata comprises a network template.

17. The method of claim 12, wherein the metadata comprises an affinity rule associated with the virtual function.

18. The method of claim 12, wherein configuring the cloud network comprises installing new equipment on the cloud network.

19. The system of claim 6, wherein the forecasted growth is for a given geographic area.

* * * * *